United States Patent Office 3,406,532
Patented Oct. 22, 1968

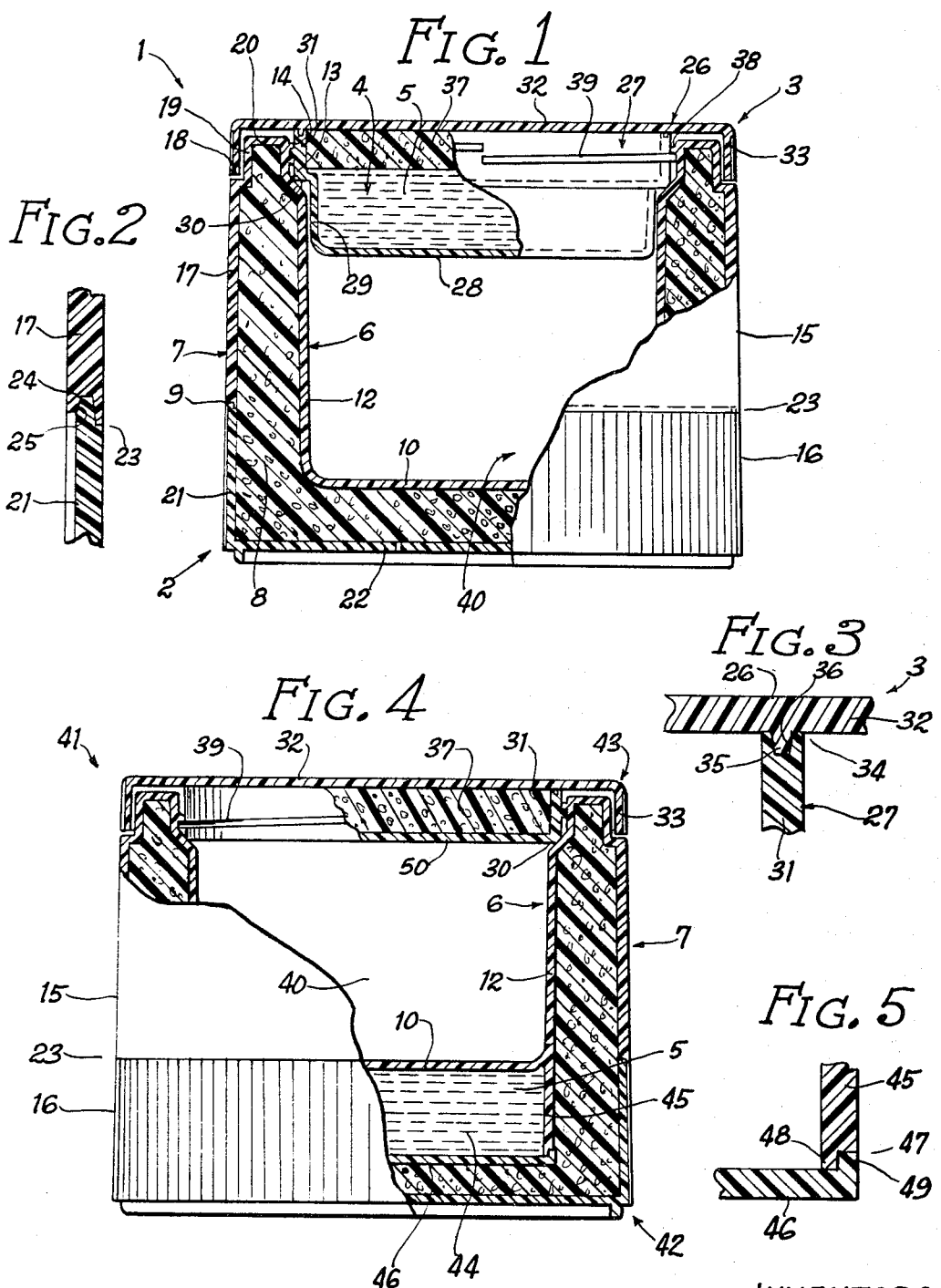

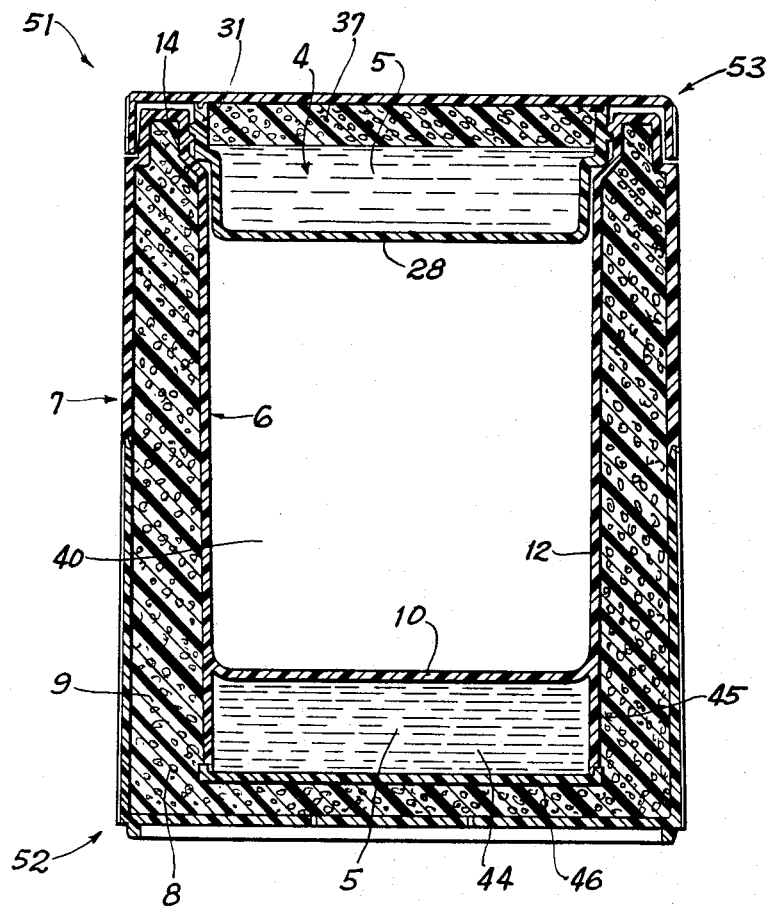

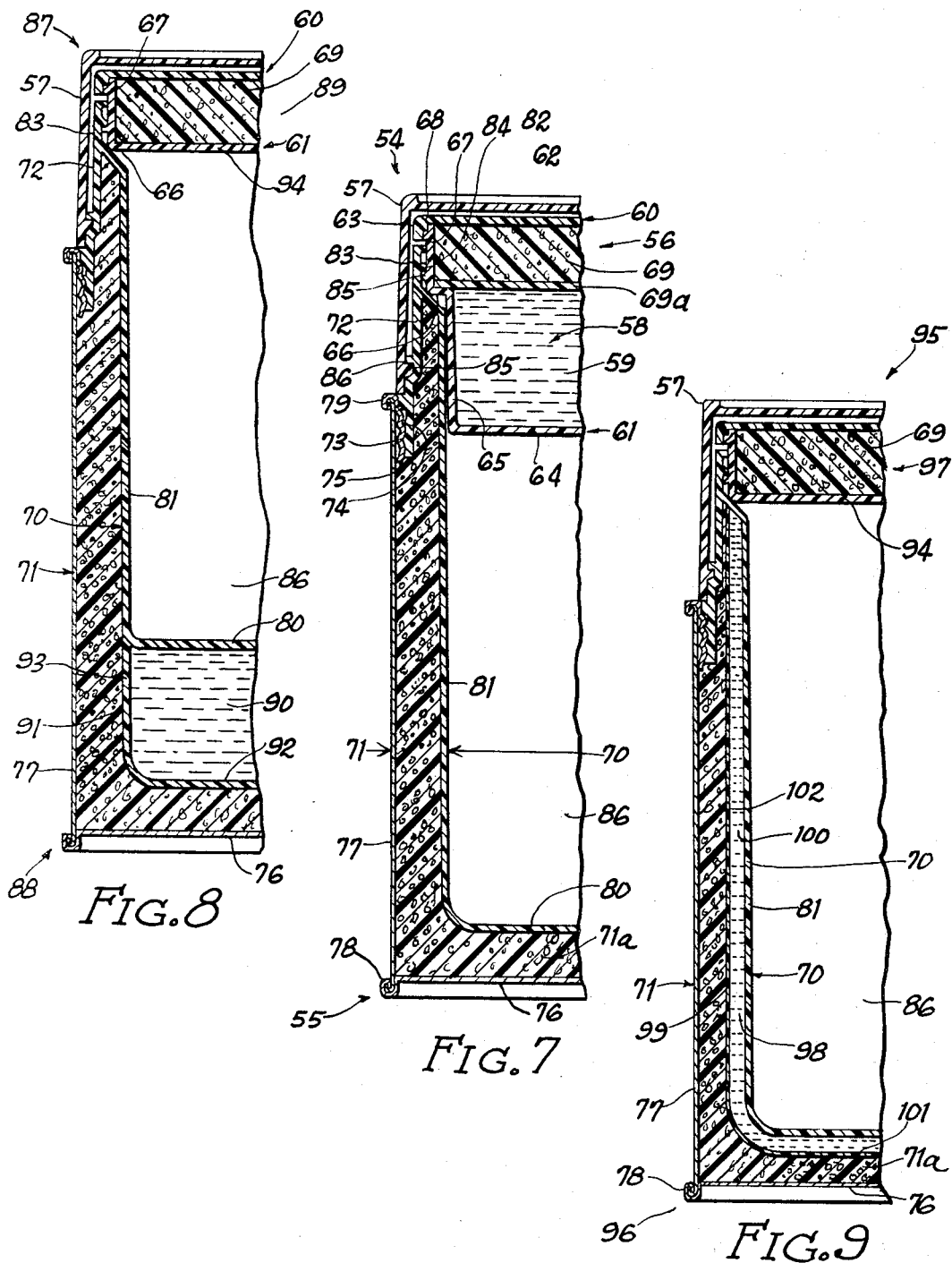

3,406,532
FOOD AND BEVERAGE CONTAINERS HAVING INTEGRAL COMPARTMENTS CONTAINING A FREEZABLE LIQUID
Robert M. Rownd and John A. Bridges, Nashville, Tenn., assignors to Aladdin Industries Incorporated, Chicago, Ill., a corporation of Illinois
Filed Nov. 9, 1966, Ser. No. 593,162
8 Claims. (Cl. 62—457)

ABSTRACT OF THE DISCLOSURE

A container, comprising an insulated receptacle having a mouth portion surmounted by an annular shoulder, a closure including a cup-shaped plastic stopper member having an enlarged cylindrical upper portion and a reduced cylindrical lower portion, a body of freezable liquid in said lower portion, a closure disc mounted in said upper portion and against the shoulder between said upper and lower portions to confine the freezable liquid, insulating material in said upper portion, and a plastic top member secured to the upper end of said stopper member. In certain embodiments, the receptacle is made of plastic and is formed with a skirt projecting downwardly below the bottom wall. A bottom closure is welded or otherwise secured to the lower end of the skirt. A body of freezable liquid is contained within the chamber formed by the skirt, the bottom wall, and the closure.

---

This invention relates to food and beverage containers, particularly insulated containers adapted to keep foods and beverages cold or hot.

One object of the present invention is to provide a new and improved container having an integral or built-in compartment containing water, or some other freezable liquid, so that the liquid may be frozen before use, to serve as a refrigerant for the food or beverage to be kept in the container.

A further object is to provide a new and improved container of the foregoing character in which the refrigerant compartment is built into the body of the container, either below the storage compartment for the food or beverage or surrounding such storage compartment.

Another object is to provide such a new and improved container in which the refrigerant compartment is built into the closure or lid for the container.

It is another object to provide such a new and improved container having refrigerant compartments built into both the body and the closure of the container.

Another object is to provide such a new and improved container which is provided with insulation for both the storage compartment and the refrigerant compartment or compartments.

A further object is to provide new and improved containers which are capable of keeping foods and beverages cold for a much larger period of time than is possible with ordinary insulated containers.

Another object is to provide new and improved containers which are especially well adapted for holding cold foods, such as salads or the like, and cold beverages, such as milk, for example.

A further object is to provide such new and improved containers which are efficient and convenient to use, yet low in cost.

Further objects and advantages of the present invention will appear from the following description, taken with the accompanying drawings, in which:

FIG. 1 is an elevational view, partly in longitudinal section, of a food container to be described as an illustrative embodiment of the present invention, such container having a refrigerant compartment in the closure or stopper.

FIG. 2 is a fragmentary enlarged section corresponding to a portion of FIG. 1 and showing the joint between the upper and lower sections of the body of the container.

FIG. 3 is a fragmentary enlarged section, corresponding to a portion of FIG. 1, and showing the joint between the upper and lower sections of the closure or stopper for the container.

FIG. 4 is a view similar to FIG. 1, but showing a modified food container having a refrigerant compartment in the body of the food container.

FIG. 5 is a fragmentary enlarged section, corresponding to a portion of FIG. 4, and showing the joint between the lower wall and the side wall of the refrigerant compartment.

FIG. 6 is an elevational section of another modified food container, having refrigerant compartments in both the body and the closure.

FIG. 7 is a fragmentary longitudinal section showing a beverage container having a refrigerant compartment in the stopper or closure thereof.

FIG. 8 is a fragmentary longitudinal section of a modified beverage container having a refrigerant compartment in the body thereof, below the storage compartment for the beverage.

FIG. 9 is a fragmentary longitudinal section of another modified beverage container, having a refrigerant compartment surrounding the storage compartment in the body of the container.

As already indicated, FIG. 1 illustrates a container 1 which is exceptionally well adapted for holding food, but may also be employed for holding beverages or the like. The container 1 is especially valuable for keeping foods and beverages cold, but may also be employed for keeping them hot.

The food container 1 comprises a body or receptacle 2 and a closure or stopper 3. In accordance with the present invention, the closure 3 has a built-in compartment 4 adapted to hold a quantity of water 5 or some other freezable liquid. Before use, the closure 3 is put in a cold place so that the water 5 will freeze into ice. Thus, the closure may be put in the freezer compartment of a home refrigerator, for example. When the container 1 is to be used, the salad or other cold food is placed in the receptacle 2, and the closure 3 is mounted on the receptacle 2. The ice within the closure 3 gradually melts and is effective to keep the food cold for a prolonged period of time.

Both the body 2 and the closure 3 are preferably of an insulated construction so as to assist in keeping the food cold. Thus, the body of receptacle 2 comprises an inner shell 6 and an outer shell 7 with a space 8 therebetween. An efficient insulating material 9 is preferably provided in the space 8. Thus, for example, the insulating material 9 may take the form of plastic foam, such as polyurethane foam, polystyrene foam or the like. Other efficient insulating materials may be employed, such as glass fibers or ground cork, for example. It is preferred to employ polyurethane foam which may be foamed in place between the inner and outer shells 6 and 7.

It is preferred to make the inner and outer shells 6 and 7 of suitable plastic materials, such as polypropylene, polyethylene, polystyrene, or the like. As illustrated, the inner shell 6 is generally cup shaped and comprises a bottom wall 10 and an annular side wall 12. Near its upper end, the side wall 12 is formed with an internal annular shoulder 13. The side wall has an enlarged portion 14 above the shoulder 13.

As illustrated, the outer shell 7 comprises upper and lower portions 15 and 16. The upper portion 15 is formed integrally with the inner shell 6, while the lower portion 16 is formed as a separate part. It will be seen that the upper portion 15 comprises an annular side wall portion 17. An external annular shoulder 18 is formed on the side wall portion 17 near its upper end. Above the shoulder 18, the side wall 17 has a reduced portion 19. A generally horizontal flange or lip 20 extends between the upper portions 14 and 19 of the inner and outer shells 6 and 7. In the illustrated construction, the flange 20 is formed integrally with the inner shell 6 and the upper portion 15 of the outer shell 7.

As illustrated, the lower portion or member 16 of the outer shell 7 is formed with an annular side wall portion 21 and a bottom wall 22.

As illustrated to best advantage in FIG. 2, a joint 23 is formed between the upper and lower portions 15 and 16 of the outer shell 7. The joint 23 may be closed or sealed by a thermal welding process, or by the use of cement or a solvent welding procedure. Thermal welding is applicable particularly to plastics such as polypropylene or polyethylene, while the use of a cement or a solvent welding process is particularly applicable to plastics such as polystyrene.

The illustrated joint 23 is of a construction which is particularly adaptable to spin welding, which is a thermal welding procedure in which the parts 15 and 16 are spun relative to each other. The resulting friction at the joint 23 generates enough heat to weld the parts together at the joint. It will be seen that the joint 23 is of the tongue-and-groove type, comprising an annular tongue 24 adapted to be received in an annular groove 25. The tongue is on one part and the groove on the other. In this case, the tongue 24 is on the lower part 16, while the groove 25 is formed in the lower edge of the upper part 15. The tongue 24 and the groove 25 are tapered or wedge-shaped to insure a tight fit.

It will be understood that the joint 23 may be welded by bringing the parts 15 and 16 together, so that the tongue 24 is inserted into the groove 25. One part is then spun relative to the other part, to such an extent that the plastic parts are brought to a welding temperature by the frictional heat generated between the parts. The spinning of the parts is discontinued to complete the welding operation.

The illustrated closure 3 is also preferably made in upper and lower parts 26 and 27. Both parts 26 and 27 are preferably made of suitable plastic materials, similar to those employed in the body 2. As illustrated, the lower part 27 is generally cup shaped and is formed with a bottom wall 28 and an annular side wall 29. A step or shoulder 30 is preferably formed in the side wall 29. Above the shoulder 30, the side wall 29 has an enlarged upper portion 31.

As illustrated, the upper part 26 of the closure 3 comprises a top wall or disc 32 having an annular skirt or flange 33. It will be seen that the skirt 33 is adapted to telescope downwardly over the reduced portion 19 of the outer side wall 17. It will be understood that the skirt or flange 33 provides means whereby the closure 3 may conveniently be grasped.

As illustrated to best advantage in FIG. 3, a joint 34 is formed between the upper and lower parts 26 and 27 of the closure 3. Various means may be employed to close or seal the joint as previously discussed. However, as before, the joint 34 is especially adaptable to a spin-welding process. Thus, the joint 34 comprises a tapering tongue 35 which is adapted to be received in a mating annular groove 36. The tongue is on one part and the groove on the other. In this case, the tongue 35 projects downwardly from the upper part 26, while the groove 36 is formed in the upper edge of the lower part 27.

The refrigerant compartment 4 is formed within the hollow annular side wall 29 of the closure 3 immediately above the bottom wall 28. Preferably, the compartment 4 is filled with water to the approximate level of the shoulder 30. An efficient insulating material 37 is preferably provided above the level of the water 5 in the space within the enlarged upper side wall portion 31, immediately below the upper wall 32. The insulation 37 may be in the form of a disc made of plastic foam. Other efficient insulating material may be employed, such as cork. The insulating material may in some cases be omitted, in which case the air within the hollow closure will still provide a considerable insulating value. Similarly, the insulation 9 may be omitted from the receptacle or body 2, in which case a considerable insulating value is still provided by the air space.

Means are preferably provided for disengageably securing the closure 3 to the body 2. In the illustrated construction, mating screw threads 38 and 39 are provided on the body 2 and the closure 3. The threads 28 project inwardly from the enlarged upper portion 14 of the inner side wall 12. The threads 39 project outwardly from the enlarged side wall portion 31 of the closure 3.

It will be seen that the shoulder 30 on the closure 3 is adapted to seat against the shoulder 13 on the body 2, so that a seal will be formed between the closure and the body.

The inner shell 6 of the body 2 forms a storage compartment 40 for the food or beverage. The storage compartment 40 is formed within the annular side wall 12 and immediately above the bottom wall 10.

For use, the closure 3 is placed in a freezer compartment or other cold place to freeze the water 5 into ice. It is often convenient to put the closure 3 in the freezing compartment over night, for use early in the morning, but the water can be frozen in a much shorter period of time. The cold food is placed in the storage compartment 40 within the body 2, and the closure 3 is then mounted on the body. The container is effective to keep the food cold for a long period of time, such as six hours, for example, so that the container is very useful for packing cold food to be consumed as part of a mid-day lunch. The ice in the closure 3 gradually melts so as to keep the food cold for a prolonged period of time.

FIG. 4 illustrates a modified food or beverage container 41, comprising a body or receptacle 42 and a closure or stopper 43. The container 41 differs from the container 1 in that a refrigerant compartment 44 is formed in the body 42, rather than in the closure 43. To the extent that the container 41 is similar to the container 1, the same reference characters are being applied to the container 41 in FIG. 4, as were applied to the container 1 in FIGS. 1–3. In this way, unnecessary duplication of description will be avoided.

In the construction shown in FIG. 4, the refrigerant compartment 44 is formed within a downwardly extending annular portion 45 which is formed on the side wall 12 of the inner shell 6. The lower end of the annular extension 45 is closed by a bottom wall or disc 46. Preferably, the bottom wall 46 is formed as a separate part. Thus, a joint 47 is preferably provided between the extension 45 and the bottom wall 46, as shown to best advantage in FIG. 5. As before, the joint 47 is preferably of a construction which is well adapted for spin welding. Thus, the illustrated joint 47 comprises an annular flange 48 which projects downwardly from the extension 45 and is adapted to be snugly received within an annular flange 49, projecting upwardly from the bottom wall 46.

The closure 43 is modified in that the refrigerant compartment 4 is omitted. The closure 43 has a bottom wall 50 which is at the level of the shoulder 30.

In the use of the modified food container 41, the body or receptacle 42 is put in a freezer compartment or any other cold place to freeze the water 5 into ice. At the proper time, the cold food is placed in the storage compartment 40 within the body 42. The closure 43 is then mounted on the body 42.

FIG. 6 illustrates another modified food or beverage container 51, comprising a body 52 and a closure or stopper 53. The container 51 differs from the previously described containers 1 and 41 in that refrigerant compartments are formed in both the body 52 and the closure 53. Thus, the closure 51 combines the features of the previously described closures 1 and 41. The body 52 may be substantially the same in construction as the body 42 of the container 41 shown in FIG. 4, although the illustrated body 52 has a somewhat larger storage capacity than the illustrated body 42. Thus, the same reference characters are being applied to the corresponding components in FIG. 6 as were applied to the components shown in FIG. 4. Similarly, the closure 53 may be substantially the same in construction as the closure 3 of FIG. 1. The same reference characters are being applied to corresponding components of the closures 3 and 53, to avoid unnecessary repetition of description.

In the use of the container 51 of FIG. 6, both the body 52 and the closure 53 are put in a freezer compartment or other cold place to freeze the two bodies of water 5 or 15 into ice. The food or beverage may then be placed in the storage compartment 40 of the body 52. The ice melts gradually and keeps the food cold for an especially long period of time. The refrigerant capacity of the container 51 is approximately double that of the individual containers 1 and 41.

FIG. 7 illustrates another modified container or bottle 54 which is especially well adapted for holding cold beverages, such as milk, for example. The illustrated bottle 54 comprises a body or receptacle 55 and a closure or stopper 56. As in the case with most insulated bottles, a drinking cup 57 is mounted on the body 55 in an inverted position, so as to cover the upper end of the closure 56.

In this case, a refrigerant compartment 58 is provided in the closure 56 to hold a quantity of water 59 or other freezable liquid. The construction of the closure 56 is similar to that of the closure 3 shown in FIG. 1. Thus, the closure 56 comprises upper and lower parts 60 and 61. The upper part 60 comprises a top wall or disc 62 having a peripheral skirt or flange 63. The lower part 61 is in the form of a generally cup-shaped shell having a bottom wall 64 and an annular side wall 65. An external annular shoulder 66 is formed on the side wall 65 near the upper end thereof. Above the shoulder 66, the side wall 65 has an enlarged annular portion 67. A suitable joint 68 is provided between the skirt 63 and the enlarged upper portion 67. As before, the joint 68 may be closed by a spin-welding procedure.

An efficient insulating material 69 is preferably provided within the enlarged upper portion 67 of the closure 60, above the level of the water 59. As before, the insulating material 69 may take the form of a plastic foam. A disc or partition 69a may be fitted into the closure 56 between the refrigerant compartment 58 and the insulation 69.

The illustrated body or receptacle 55 comprises an inner shell 70 and an outer casing 71, with plastic foam or other insulating material 71a therebetween. An annular collar portion 72 extends between the upper end of the inner shell 70 and the casing 71. In this case, the collar portion 72 is formed integrally with the inner shell 70, which is preferably made of a suitable plastic material, such as polypropylene, polyethylene, polystyrene or the like. The illustrated collar 72 screws into the casing 71. Thus, the lower end of the collar 72 is formed with external threads 73 adapted to mate with internal threads 74, formed on a ring 75 which is secured inside the upper end of the casing 71.

In this instance, the casing 71 comprises a bottom wall 76 and a side wall 77 made of sheet metal. However, the casing may also be made of a suitable plastic material. As shown, a crimped joint 78 is formed between the bottom wall 76 and the side wall 77. The illustrated ring 75 is also made of sheet metal and is secured to the side wall 71 by another crimped joint 79.

The illustrated inner shell 70 has a bottom wall 80 and an annular side wall 81. An internal annular shoulder 82 is formed on the side wall 81 near its upper end. The shoulder 66 on the closure 56 is adapted to seat against the shoulder 82 on the inner shell 70.

Above the shoulder 82, the inner shell 70 is formed with an enlarged annular portion 83 formed with internal screw threads 84. Mating screw threads 85 are formed on the enlarged upper portion 67 of the closure 56.

The cup 57 is preferably adapted to be screwed onto the collar portion 72. Thus, mating screw threads 85 and 86 are preferably formed on the cup 57 and the collar portion 72.

In the use of the beverage container 54, the closure 56 is put in a freezer compartment or other cold place to freeze the water 59 into ice. A cold beverage, such as milk, is then placed in the inner shell 70, which forms a storage compartment 86 for the beverage. The closure 56 and the cup 57 are then mounted on the receptacle 55. The gradual melting of the ice in the closure 56 keeps the beverage cold for a prolonged period of time, such as six hours. Thus, the container is especially well adapted for keeping a beverage cold for a mid-day lunch or the like. The container is essentially unbreakable, so that it is well adapted for use by school children.

FIG. 8 illustrates a modified container 87 which is quite similar to the container 54 of FIG. 7, except that the refrigerant compartment is provided in the body of the container, rather than in the closure. Thus, the container 87 comprises a body or receptacle 88 and a closure 89. A refrigerant compartment 90 is formed in the body 88 below the beverage compart 86. The refrigerant compartment 90 is formed by a cup-shaped extension 91 on the lower end of the inner shell 70. It will be seen that the cup-shaped extension 91 comprises a bottom wall 92 and an annular side wall 93. The extension 91 is suitably secured to the inner shell 70.

The closure 89 is similar to the closure 56, except that the refrigerant compartment 58 is omitted. Thus, the closure 89 has a bottom wall 94 at the level of the shoulder 66.

The other components of the container 87 are similar to the corresponding components of the container 54 and are identified by the same reference characters, to avoid unnecessary repetition of description.

FIG. 9 illustrates another modified container or bottle 95 which comprises a body 96 and a closure 97. The container 95 is similar to the container 87 of FIG. 8, except that the refrigerant compartment is arranged to surround the beverage compartment 86. Thus, the body or receptacle 96 is provided with a refrigerant compartment 98 which is formed between the inner shell 70 and an intermediate shell or casing 99.

A body of water 100 or other freezable liquid is provided in the compartment 98. The intermediate shell 99 may be welded, cemented or otherwise secured to the inner shell 70, near the upper end thereof. It will be seen that the intermediate shell 99 has a bottom wall 101 which is formed integrally with a generally cylindrical side wall 102. The intermediate shell 99 is preferably made of a plastic material, similar to the material of the inner shell 70.

The body 96 of the insulated container or bottle 95 is otherwise similar to the body 55 of the container 54 shown in FIG. 7. The same reference characters have been applied to corresponding components of the two containers, to avoid unnecessary repetition of description. The closure 97 of FIG. 9 may be substantially the same as the closure 89 of FIG. 8.

As described in connection with FIG. 8, the container 95 of FIG. 9 is used by putting the body 96 in a freezer or other cold place so as to freeze the water 99. This is preferably done with the cup 57 and the closure 97 removed so that there will be a comparatively rapid transfer of heat between the refrigerant compartment 98 and the freezer. After the ice has been frozen, the milk or other cold beverage is placed in the storage compartment 86 within the inner shell 70. The closure 97 and the cup 57 are then mounted on the container or bottle 95.

The ice keeps the beverage cold for a prolonged period of time. Moreover, the insulating material 59 and 71a minimize the transfer of heat from the outside atmosphere to the cold beverage. Thus, the ice in the refrigerant compartment 98 melts very slowly.

As before, refrigerant compartments may be provided in both the body and the closure of the insulated bottle. This may be achieved by mounting the closure 56 of FIG. 7 on the body 88 of FIG. 8, or on the body 96 of FIG. 9.

The provision of food or beverage containers with built-in refrigerant compartments makes it possible to keep foods and beverages cold for a much longer period of time than is possible with ordinary insulated containers. With the containers of the present invention, foods and beverages can be kept cold for a period of time comparable to that achieved with thermos bottles or other vacuum insulated receptacles.

The food and beverage containers of the present invention have the additional advantage of being substantially unbreakable, inasmuch as all components of the containers may be made of non-fragile materials such as metal and plastics. Thus, the food and beverage containers of the present invention are especially well suited for packing lunches for school children. It will also be evident that the containers of the present invention may be manufactured at low cost.

Various other modifications, alternative constructions and equivalents may be employed without departing from the true spirit and scope of the invention, as exemplified in the foregoing description and defined in the following claims.

We claim:
1. A closure for an insulated container or the like, comprising the combination of
   a hollow generally cup-shaped stopper member having a circular bottom wall and an annular side wall formed integrally therewith of resinous plastic material,
   said annular side wall having substantially cylindrical upper and lower portions with an annular shoulder therebetween,
   said upper portion being of substantially greater diameter than said lower portion,
   a body of freezable liquid in said lower portion,
   a closure disc of resinous plastic material mounted in said upper portion and against the upper side of said shoulder to confine said freezable liquid,
   insulating material disposed in said upper portion above said disc,
   and a circular top member made of resinous plastic material and closing the upper end of said cup-shaped stopper member for confining said insulating material,
   said top member being secured to said annular upper portion of said side wall.
2. A closure according to claim 1, including
   a bonded joint between said top member and said stopper member.
3. A closure according to claim 1, including
   a welded joint between said top member and said stopper member.
4. A container for foods, beverages, or the like, comprising the combination of
   an insulated receptacle having an upper annular mouth portion surmounted by an upwardly facing annular shoulder portion projecting outwardly from said mouth portion,
   a closure including a hollow generally cup-shaped stopper member having a circular bottom wall and an annular side wall formed integrally therewith of resinous plastic material,
   said annular side wall having substantially cylindrical upper and lower portions with an annular shoulder therebetween,
   said lower portion being removably received in said mouth portion and being substantially smaller in diameter than said neck portion,
   said upper portion being substantially larger in diameter than said lower portion,
   said shoulder on said closure being disengageably seated against said shoulder portion on said receptacle,
   a body of freezable liquid in said lower portion on said stopper member,
   a closure disc of resinous plastic material mounted in said upper portion and against the upper side of said shoulder to confine said freezable liquid,
   insulating material disposed in said upper portion above said disc,
   and a circular top member made of resinous plastic material and closing the upper end of said cup-shaped stopper member for confining said insulating material,
   said top member being secured to said upper portion of said side wall on said stopper member.
5. A container according to claim 4, comprising
   an annular mounting member projecting upwardly from said shoulder member on said insulated receptacle,
   said upper portion of said side wall on said stopper member being removably received in said annular mounting member,
   and mating screw thread elements on said upper portion and said mounting member for disengageably securing said closure to said receptacle.
6. A container for foods, beverages, or the like, comprising the combination of
   a receptacle made of resinous plastic material and including a circular bottom wall and an annular side wall formed integrally therewith,
   an annular skirt formed integrally with said receptacle and projecting downwardly therefrom substantially below said bottom wall,
   a circular bottom closure disc made of resinous plastic material and secured to the lower end of said skirt,
   said skirt, said bottom wall, and said bottom closure disc forming a closed chamber,
   a body of a freezable liquid within said chamber,
   an outer shell mounted around said receptacle and spaced outwardly from said receptacle, said skirt, and said bottom closure disc,
   and insulating material disposed in said outer shell around said receptacle, said skirt and said bottom closure disc.
7. A container according to claim 6, including
   a bonded joint between said bottom closure disc and said skirt.
8. A container according to claim 6, including
   a welded joint between said bottom closure disc and said skirt.

References Cited

UNITED STATES PATENTS

| | | | |
|---|---|---|---|
| 907,099 | 12/1908 | Trowbridge | 62—457 |
| 995,188 | 6/1911 | Seely | 62—529 X |
| 1,551,709 | 9/1925 | Stoll | 62—457 X |
| 1,571,438 | 2/1926 | Schopf | 62—457 X |
| 2,187,387 | 1/1940 | Trigg et al. | 62—457 X |
| 2,225,792 | 12/1940 | Nicholls | 62—457 X |
| 2,504,911 | 4/1950 | Whitecar | 62—457 |
| 2,781,643 | 2/1957 | Fairweather | 62—372 |

ROBERT A. O'LEARY, *Primary Examiner.*